US008068934B2

(12) United States Patent
Saltsov

(10) Patent No.: US 8,068,934 B2
(45) Date of Patent: Nov. 29, 2011

(54) MEDICATION DISPENSER

(76) Inventor: Leon Saltsov, Thornhill (CA)

( * ) Notice: Subject to any disclaimer, the term of this patent is extended or adjusted under 35 U.S.C. 154(b) by 356 days.

(21) Appl. No.: 12/458,443

(22) Filed: Jul. 13, 2009

(65) Prior Publication Data

US 2010/0030374 A1 Feb. 4, 2010

(30) Foreign Application Priority Data

Jul. 31, 2008 (CA) .................................... 2638437

(51) Int. Cl.
*G06F 17/00* (2006.01)

(52) U.S. Cl. ........ 700/242; 700/240; 700/243; 221/121; 221/122; 221/153

(58) Field of Classification Search .................. 221/120, 221/121, 122, 151, 153, 154, 281; 700/240, 700/242, 243
See application file for complete search history.

(56) References Cited

U.S. PATENT DOCUMENTS 4,572,403 A 2/1986 Benaroya
4,573,606 A 3/1986 Lewis
4,674,651 A 6/1987 Scidmore
4,838,453 A 6/1989 Luckstead
5,044,516 A 9/1991 Hoar
5,176,285 A 1/1993 Shaw
5,609,268 A * 3/1997 Shaw ................................ 221/2
6,439,422 B1 * 8/2002 Papp et al. ...................... 221/13
6,449,218 B1 9/2002 Lluch
6,510,962 B1 1/2003 Lim
6,611,733 B1 * 8/2003 De La Huerga .............. 700/242
6,799,725 B1 10/2004 Hess
6,848,593 B2 2/2005 Papp
7,158,011 B2 1/2007 Brue
7,293,673 B2 * 11/2007 Savage et al. ................ 221/122
2001/0028308 A1 10/2001 De La Huerga
2007/0185615 A1 8/2007 Bossi
2008/0119958 A1 5/2008 Bear

* cited by examiner

*Primary Examiner* — Timothy Waggoner

(57) ABSTRACT

A medication dispensing system uses a series of medication rings grouped as a rotary drum and controlled for dispensing medication on a daily basis into a divided pill box. Each medication ring includes an associated medication collar that cooperates with the medication ring to reduce the possibility of abrasion of the medication dosages held in the medication rings. The pill box is moved and rotated within the dispensing system by a carriage to dispense medication into appropriate cells of the pill box. A computer control module controls the movement of the various components and is programmable for loading and dispensing different medication regimes.

12 Claims, 8 Drawing Sheets

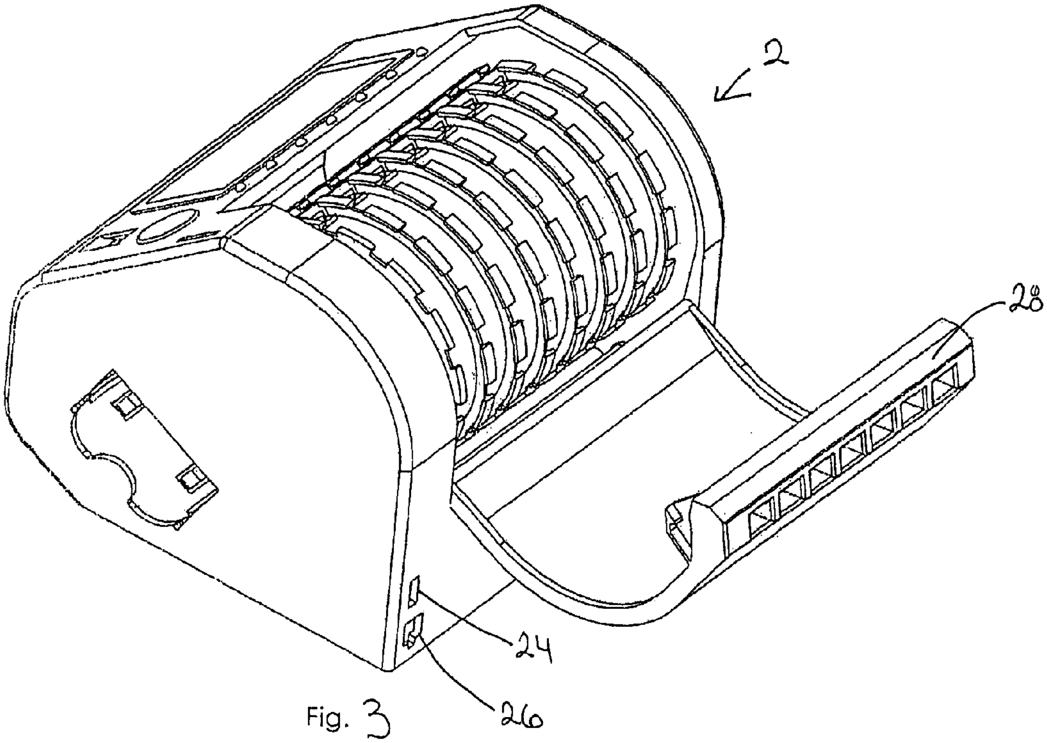
Fig. 3
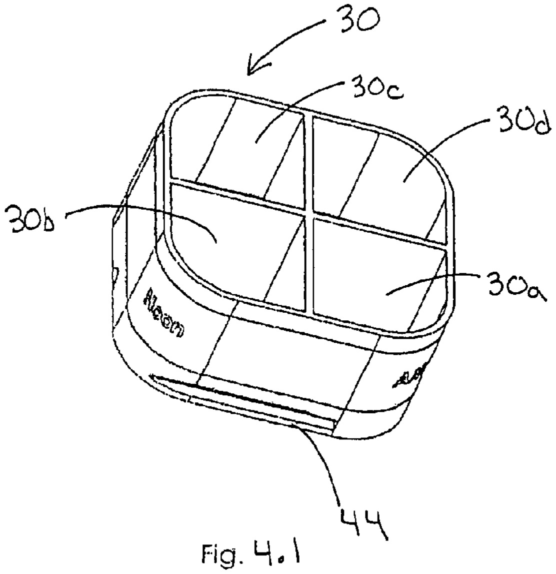
Fig. 4.1
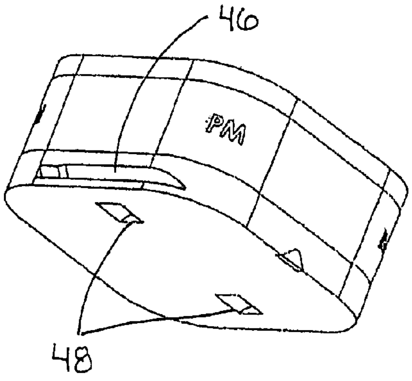
Fig. 4.2

MEDICATION DISPENSER

FIELD OF THE INVENTION

The present application is directed to an apparatus for dispensing of medication, typically on a daily basis. The device is primarily designed for direct use by a patient.

BACKGROUND OF THE INVENTION

There are a number of proposed devices to assist a person in properly dispensing and tracking prescribed medication on a daily or hourly basis. The dispensing of medication is not normally a problem if there are only one or two medications to be taken daily or at different hours through the day, however the problem becomes more critical as the number of different medications increases. In addition, certain users may not be capable of, or have difficulty in, reliably dispensing medication. Errors causing over or under medication conditions are responsible for thousand of preventable deaths each year.

There have been various solutions proposed for managing medication including large pill dispensing boxes having a number of cavities corresponding to morning, noon and dinner and bedtime. Some of these systems are designed for a seven day period. These systems require the user or a trusted individual to effectively dispense multiple medications into each cavity corresponding to a particular day and time.

Other systems have been proposed that control the dispensing of the medication. U.S. Pat. No. 6,848,593 discloses a radial dispensing apparatus that uses portable medication cartridges. These cartridges are rotated and dispense a particular medication at a particular angular position. With this system each medication must be prepackaged in a standardized configuration for loading into the device.

There are also a number of other devices that are designed to control the dispensing of medication. Many of these devices are provided with alarms that are activated when the medication is not removed from the device at the appropriate time. In this way, an alarm or warning signal is provided to the user that a particular medication is available for dispensing and should be taken. A number of these devices also communicate with a remote computer using a telephone, internet or other communication method and can provide additional warnings or messages to third parties of potential medication irregularities.

There remains a need for an effective medication dispenser that operates in a manner that is convenient to the end user while ensuring the prescribed medication is made available to the person on a daily basis. This need continues to increase and become more critical as the number of senior citizens maintaining an independent lifestyle continues to grow.

SUMMARY OF THE INVENTION

A medication dispensing system according to the present invention comprises a motor controlled rotary drum, a driven movable carriage positioned at lower edge of said drum adapted to rotatably receive a pill box, a divided pill box having a number of cells with said pill box attachable to said movable carriage for receiving medication dispensed from said rotary drum, and a computer control module for receiving dispensing control information and loading control information of medication loaded into or dispensed from said rotary drum.

The motor controlled rotary drum is divided into a series of medications rings with each ring having a series of medication cells open at a periphery of the drum with each medication cell sized to receive a single medication dosage. The drum further includes movable collars with each collar associated with one of said medication rings and partially rotatable relative to the medication ring to open any of said medication cells for loading of or dispensing of medication. Each collar is movable to a position closing the cells of the medication ring and rotatable with the drum if medication is not being loaded or dispensed. The computer control module controls the drive of the rotary drum, the driven carriage and the position of the pill box to allow dispensing of medication into the appropriate cells of the pill box.

In a preferred aspect of the invention, the rotary drum includes a medication loading position and a medication dispensing position at the same angular positions for each medication ring.

In yet a further aspect of the invention, each movable collar is independently rotatable on the drum to a loading position opening a cell of the associated medication ring to a dispensing loading port through which medication is loaded. The movable collar is independently rotatable on said drum to a dispensing position opening a cell of the associated medical ring to a dispensing port through which medication is dispensed into the pill box.

In an aspect of the invention each movable collar is only movable to the dispensing position when the carriage has been moved to locate the pill box aligned below the dispensing position.

In a preferred aspect of the invention, each movable collar has a port through which medication passes during the loading or dispensing of the medication associated with the medication ring.

In a different aspect of the invention, the control system includes as part of a pill box load procedure and a pill box release procedure, a security step requiring the user to input security information that is compared with preauthorized security information and only proceeds if a match is obtained.

In a preferred aspect of the invention, the system includes a touch screen input through which a user can program the system with respect to a desired medication regime of at least one user.

In a preferred aspect of the invention, the system is programmable for different medication regimes of at least two users.

According to an aspect of the invention, the pill box is a daily pill box divided into four quadrants corresponding to morning, noon, dinner and evening time periods.

In a preferred aspect of the invention, the pill box is rotatable on the movable carriage to dispense the particular medication into the appropriate cell of the divided pill box.

In a further aspect of the invention, the pill box is rotatable on the platform generally about a center axis of the pill box.

BRIEF DESCRIPTION OF THE DRAWINGS

Preferred embodiments of the invention are shown in the drawings, wherein:

FIG. 3 is a perspective view of the medication dispenser with a lid cover in an open service position;

FIG. 4.1 is a perspective view of the four quadrant pill box;

FIG. 4.2 is a perspective view showing the bottom surface of the four quadrant pill box;

DETAILED DESCRIPTION OF THE PREFERRED EMBODIMENTS

Figure 1:
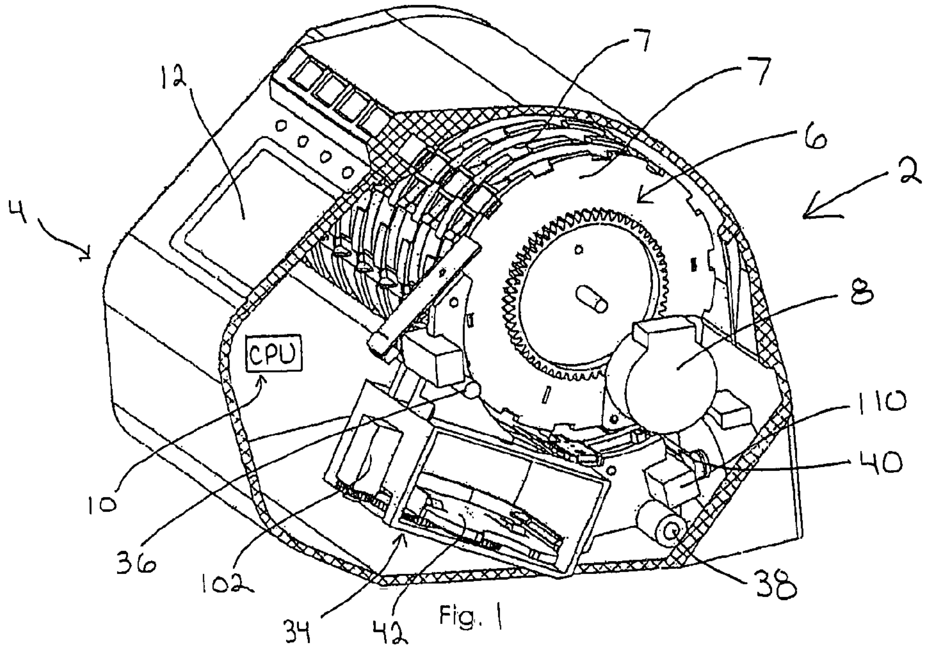
FIG. 1 is a perspective partially cut away view showing working components of the medication dispenser.

The medication dispenser 2 shown in FIG. 1 includes an outer case 4 that houses the main drum assembly 6. The main drum assembly includes a series of medication rings 7 with each medication ring having its own medication collar 9. Further details of the main drum assembly will be described in subsequent figures.

Figure 2:
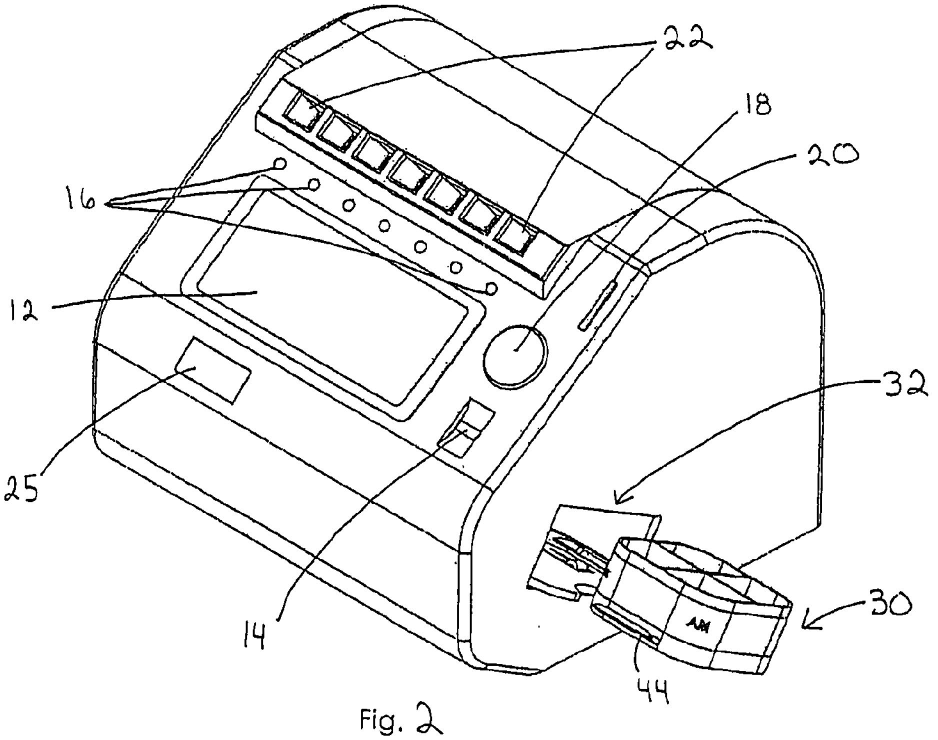
FIG. 2 is a perspective view showing the medication dispenser about to receive a four quadrant pill box.
Figure 6:
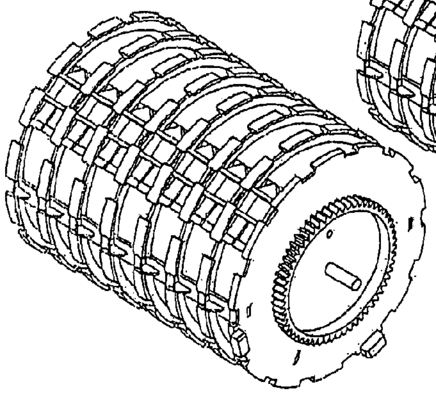
FIG. 6 is a perspective view of the main drum assembly.
Figure 5:
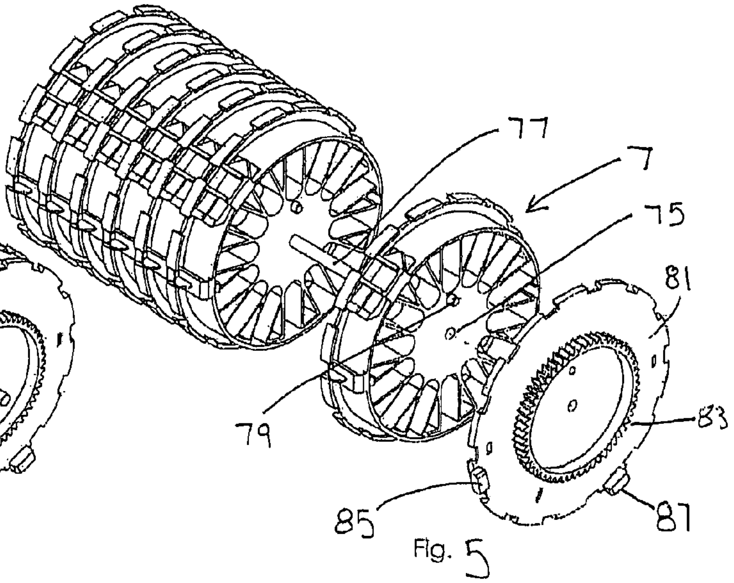
FIG. 5 is a partial exploded perspective view showing the main drum assembly.
Figure 7:
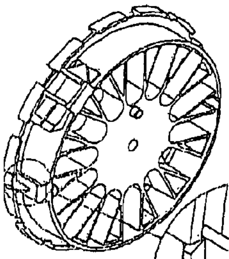
FIG. 7 is a perspective view of a medication ring-forming part of the main drum assembly.
Figure 8:
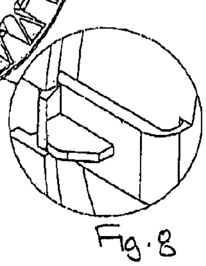
FIG. 8 is a partial perspective view of an alignment structure for aligning the medication ring with the associated medication collar.
Figure 9:
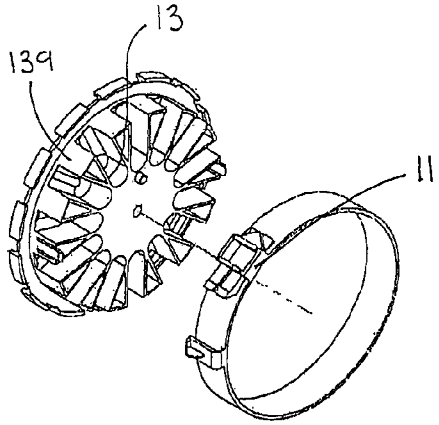
FIG. 9 is an exploded perspective view of the medication ring and associated collar.
Figure 10:
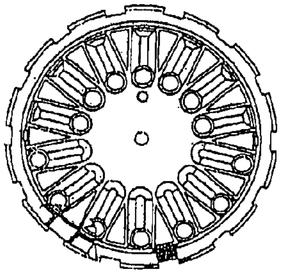
FIG. 10 is a side view of the medication ring and medication collar with the medication collar in a non-dispensing position.
Figure 11:
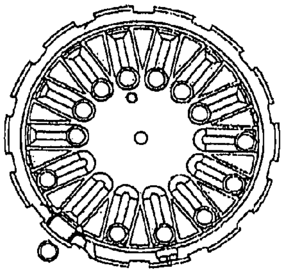
FIG. 11 is an end view of the medication ring and medication collar in a dispensing position.

The stepper motor 8 is used to control the position of the main drum assembly 6 with the stepper motor receiving drive signals from the central processing unit indicated as 10. The medication dispenser 2 includes a touch screen input 12 that allows the user to activate various modes of the device for initially providing information with respect to the particular medications to be controlled, the dispensing times of the medication, and the details of the user. A finger print reader 14 is shown in FIG. 2 that can also be used to provide controlled authorization of the medication dispenser. Passwords or other security approaches can also be used.

The outer case 4 of the medication dispenser 2 includes a speaker 18 to allow effective communication with the user. Verbal instructions are provided as part of the loading sequence and at other times. In addition, the dispenser can include a memory card slot 20 for receiving a memory card providing particular instructions to the dispenser regarding medication dispensing. It may be preferable or desirable for a pharmacy or perhaps an individual user to enter this information on a memory card and merely provide the memory card to the medication dispenser. For example, for a particular user, up to seven different medications can be controlled with the arrangement shown in the Figures, and it may be more desirable to enter the information concerning the medication regime and the details of the user at a personal computer with appropriate software and use the memory card to transfer this information.

As shown in FIGS. 1 and 2, the main drum assembly 6 has seven medication rings and the case 4 is provided with seven loading windows or ports 22 for loading of the medication rings. Each of the windows 22 is associated with one of the medication rings 7 with each ring having an associated medication collar 9. The medication collar 9 effectively closes the individual medication cells provided in the medication ring and also closes the ports 22. The collar is controlled relative to the medication ring to align a port in the collar with the appropriate cell of the medication ring to allow loading of the medication for the dispensing of medication as will be subsequently described and also allows dispensing of the medication from the cell to the pill box.

A barcode reader 25 is shown in FIG. 2 and can be used to simplify the loading of different medications and the different time the medication is to be taken. A previously programmed medication can be associated with a unique barcode recognized by the dispensing system. To refill the system, a barcode on a label of the dispensed medication from a pharmacist can be scanned and the device will then know which medication ring to load. A barcode or part of the medication barcode could provide the times the medication is to be taken. This approach can simplify loading and dispensing of medication and reduce the input steps the user must complete.

As shown in the rear perspective view of FIG. 3, the medication dispenser 2 can also include a USB connection 24 and/or a telephone jack 26. The USB connection 24 and/or the telephone jack 26 provide the device with a two-way communication channel for connection with a remote computer or other device. This may be used to connect with an authorized instructing computer.

In FIG. 3, the medication dispenser 2 is shown with the back drum cover 28 in a release position. This release position is typically only used to service the main drum assembly 6. The cover remains closed during the loading of the main drum assembly 6 and during the dispensing of the medication.

FIG. 2 illustrates the four quadrant pill box 30 about to be inserted into the medication dispenser 2. The four quadrant pill box 30 has two internal partitions dividing the pill box into four cells corresponding to morning, AM or noon, dinner, and evening or PM. This four quadrant pill box 30 and the individual cells are shown in FIG. 4.1 as 30*a*, 30*b*, 30*c* and 30*d*. The four quadrant pill box 30 is received within a sliding pill box carriage 34 as shown in FIG. 1. The pill box carriage 34 is moveable beneath each of the medication rings 7 for receiving dispensed medication. The pill box carriage 34 can only receive the four quadrant pill box 30 in one orientation thereof due to the orientation guide grooves 44 and 46 which receive the guide ribs 45 and 47. The rotatable platform 42 allows rotation of the four quadrant pill box 30 when it is properly received on the rotatable platform 42 for dispensing into one of the four cells of the pill box 30*a* through 30*d*. The four quadrant pill box 30 is rotated with the rotatable platform 42 generally about the center axis of the pill box.

Figure 14:
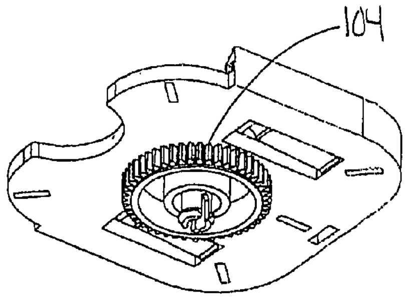
FIG. 14 is a bottom view of the pill box platform.
Figure 15:
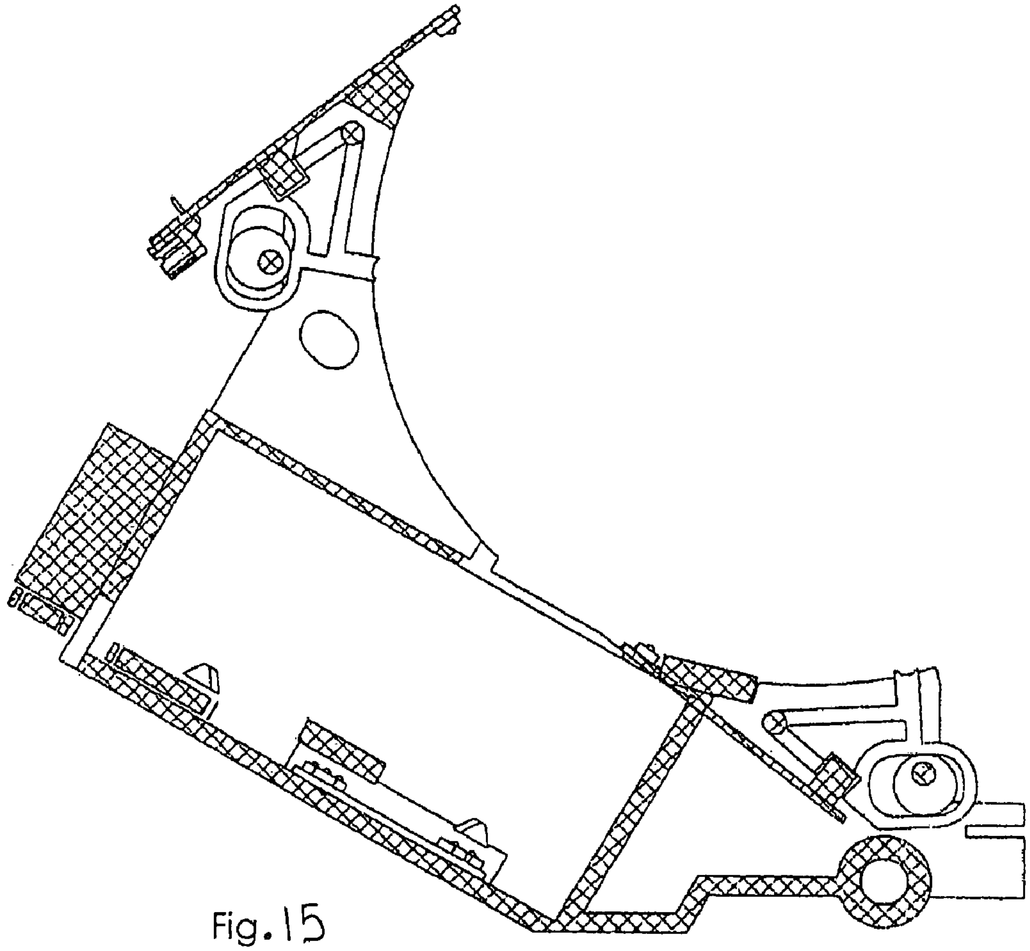
FIG. 15 is a partial cut-away of the pill box carriage.

As shown in FIG. 1, a motor 102 is carried on the carriage 34 and meshes with a series of gears that effectively control the centre rotation gear 104 of the rotatable platform 42 shown in FIG. 14. The motor 102 thereby controls the position of the four quadrant pill box 30 beneath a dispensing opening for loading of any medication into a particular cell 30*a* through 30*d* of the four quadrant pill box 30. The platform 42 also includes latching arms 49 which engage and latch with the latching recesses 48 of the four quadrant pill box 30.

With this particular arrangement, the four quadrant pill box 30 can only be received in the pill box carriage 34 provided at one end of the medication dispenser 2 as shown in FIG. 2, in the particular orientation as shown. This provides proper registration of the four quadrant pill box 30 with the rotatable platform 42 and with the medication dispenser 2. This is effectively a loading or insert position of the four quadrant pill box 30 as well as a removal position for the four quadrant pill box 30. Once the four quadrant pill box 30 has been appropriately loaded into the carriage 34, the motor 110 drives a timing belt 40 and controls the position of the carriage 34 and effectively the four quadrant pill box 30 at various positions beneath the main drum assembly 6. This arrangement ensures that the four quadrant pill box 30 is appropriately located below a medication ring 7 for receiving medication and also the relative position of the cells of the four quadrant pill box 30 is controlled by the relational position of the platform 42.

Figure 12:
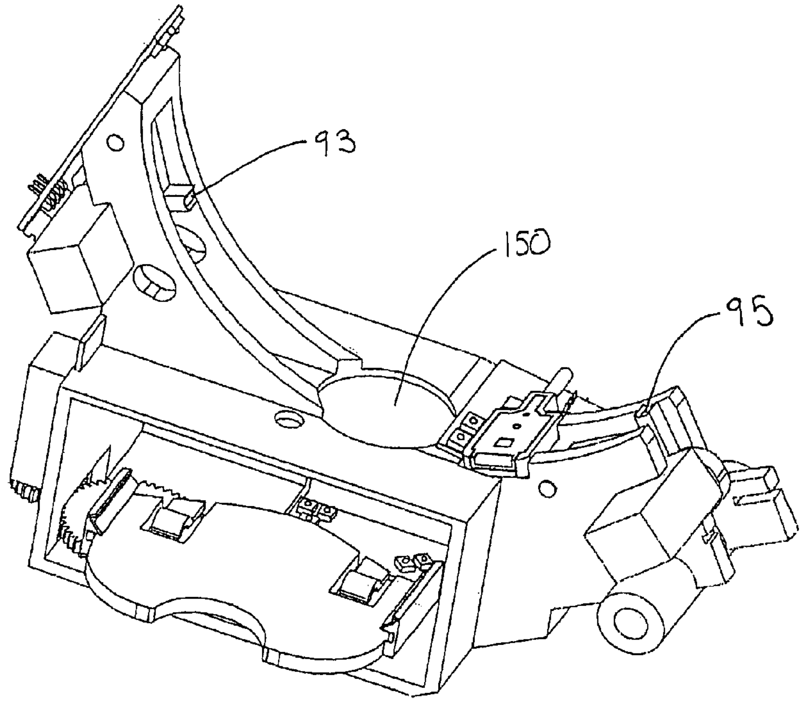
FIG. 12 is a perspective view of the pill box carriage.
Figure 13:
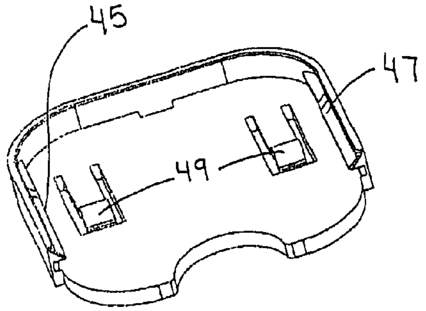
FIG. 13 is a perspective view of the pill box platform.

The pill box carriage 34 includes guide rails 36 and 38 that allow sliding of the carriage to aligned positions below the main drum assembly 6. Further details of the carriage 34 are shown in the perspective view of FIG. 12. The carriage 34 includes a dispensing port 150 that allows dispensing of the medication into one of the four quadrants of the pill box 30.

Details of the main drum assembly 6 are shown in FIGS. 5 through 11. Each of the individual medication rings 7 include a center port 75 which receives the guide shaft 77. In addition, each of the medication rings 7 include a protrusion 79 which includes a cavity on the rear side thereof for receiving the protrusion of an adjacent medication ring 7. In this way, the medication rings are aligned and engaged, and rotate as a group.

Figure 16:
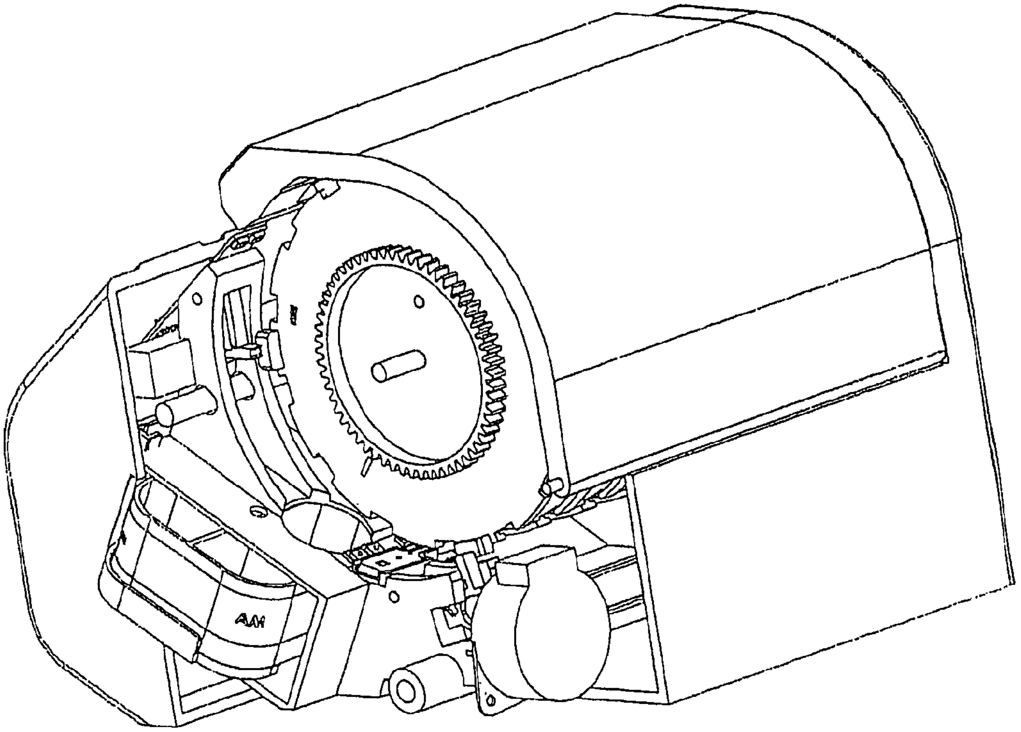
FIG. 16 is a partial cut-away of the medication dispenser showing the carriage in an end position.
Figure 17:
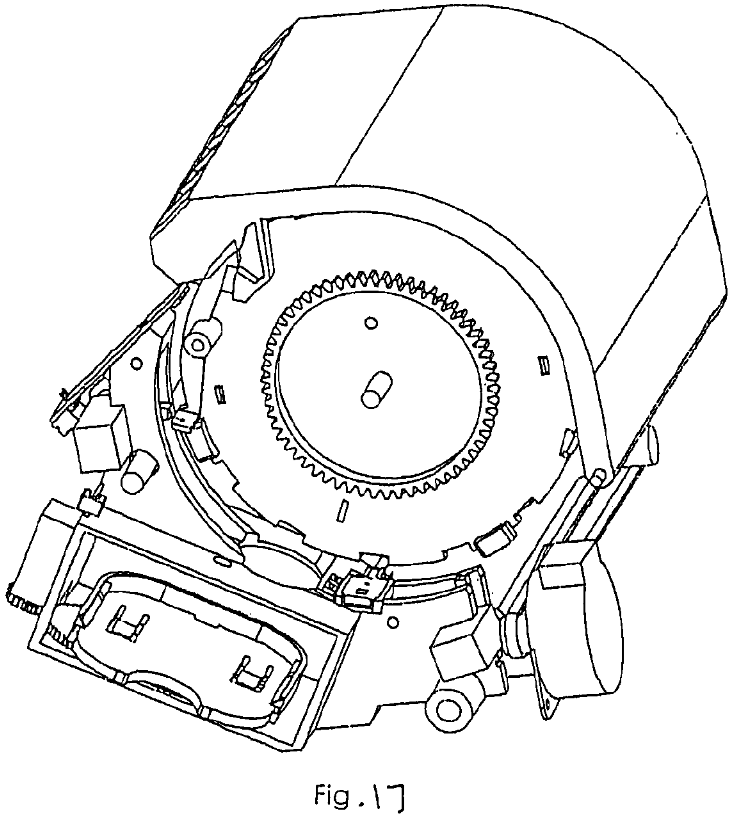
FIG. 17 is an end view of the medication dispenser partially cut-away to show the relationship with the carriage and the main drum assembly.
Figure 18:
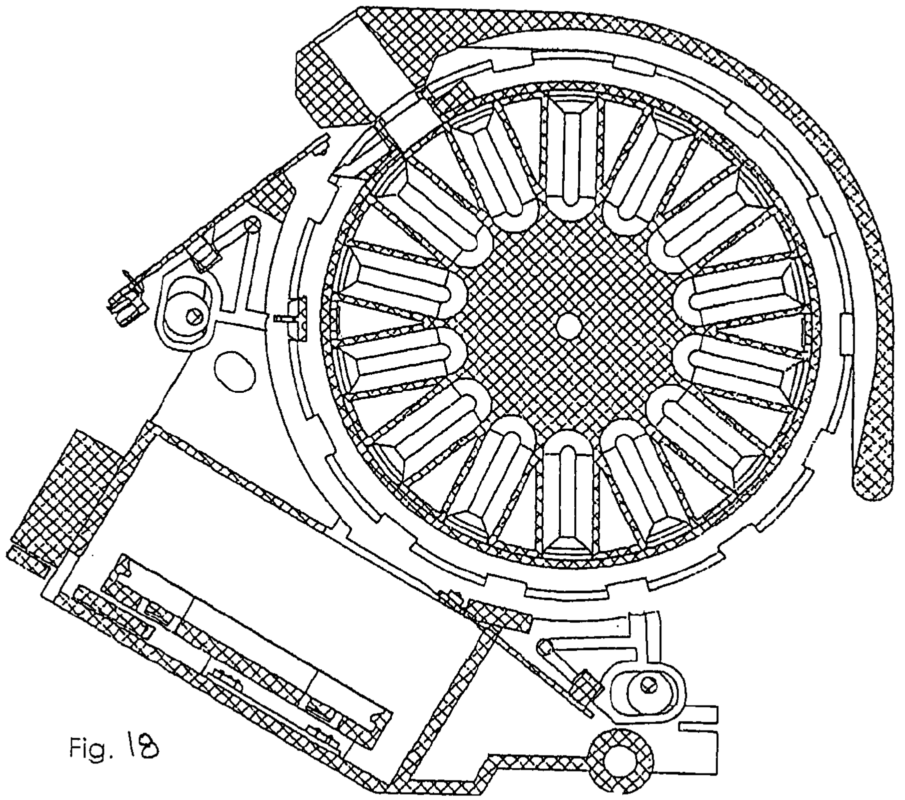
FIG. 18 is a partial cut-away through the main drum assembly and carriage.
Figure 19:
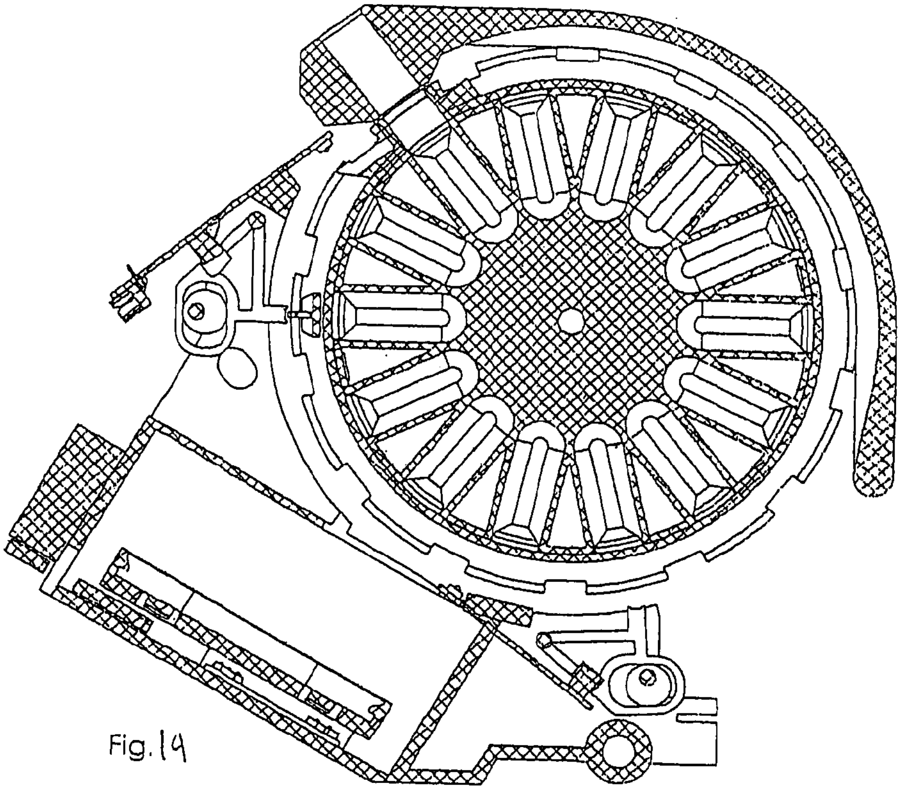
FIG. 19 is a view similar to FIG. 18 showing the loading of pills into one of the medication rings.

The main drum 6 is rotated by means of the drive ring 81 in mesh with drive gear 83 driven by the stepper motor 8. The drive ring 81 also includes stop lugs 85 and 87 which provide stops for the carriage when it is in the loading position as shown in FIG. 16. In this way, the carriage is mechanically stopped and any forces due to insertion of the four quadrant pill box 30 are not transmitted to the timing belt or other mechanisms that could be damaged. The carriage includes stop lugs 93 and 95. These lugs, with the drive ring 81 in a loading position, will contact the stop lugs 85 and 87. When the drive ring is rotated to allow the carriage 34 to be moved into the device, the lugs are free to pass through one of the ports. Basically, the ring 81 in a load position of the four quadrant pill box 30 provides a stop surface for the pill box carriage 34.

Figure 20:
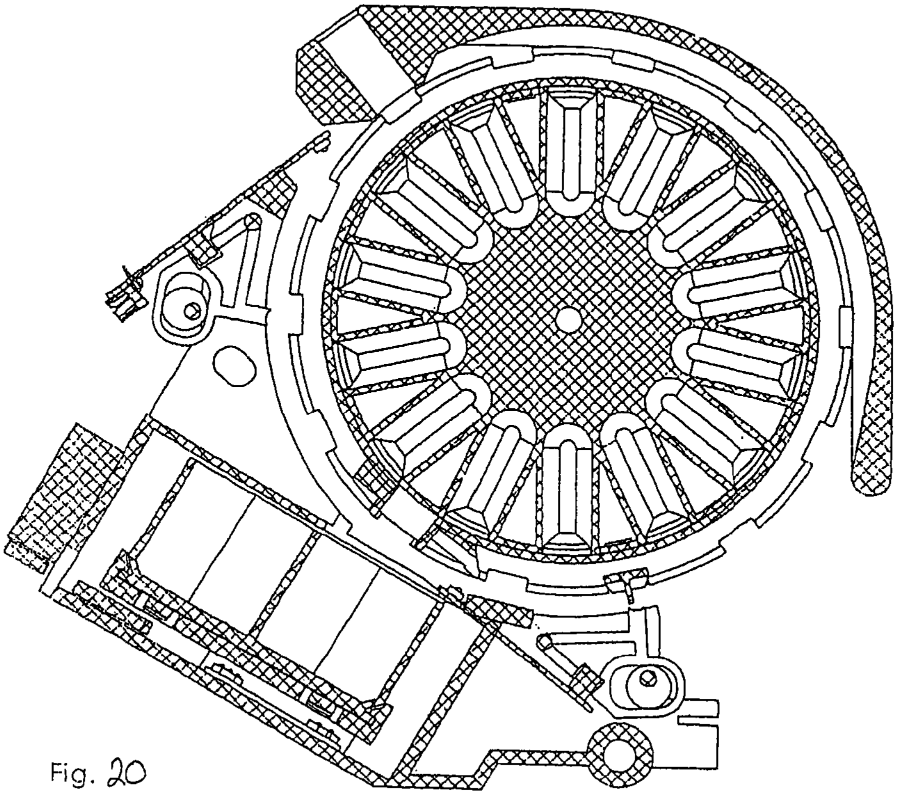
FIG. 20 is a cut-away view showing the main drum assembly and the carriage with the medication collar in a locked position.
Figure 21:
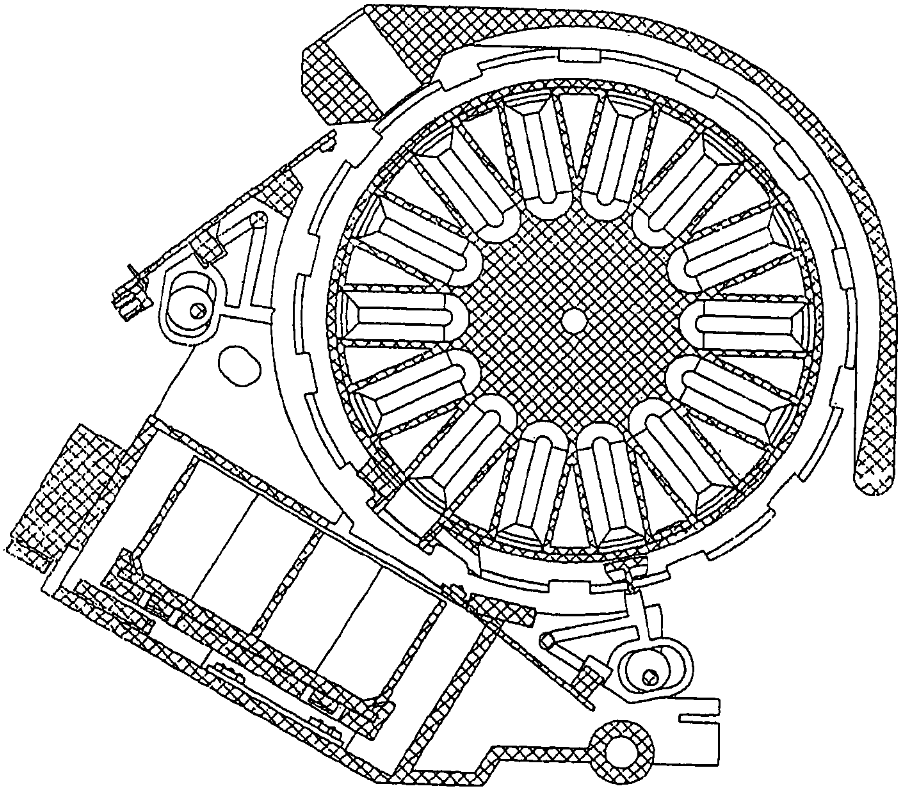
FIG. 21 is a view similar to FIG. 20 with the medication collar in a dispensing position.

The touch screen input 12 is used for programming the device and to allow loading of medications into any of the medication rings 7 through the windows 22. The main drum 6 is rotated as a group although the individual medications are fed through the individual loading windows 22. Each medication collar 9 includes a feed port 11 and the collar is effectively rotated to allow either the loading of a particular pill into a particular cell 13 of the medication ring 7, or this port is positioned over one of the block wedges 13*a* provided between cells 13. The position of the medication collars 9 is controlled by the carriage which includes a drive member for driving of the individual parts provided on the collar. The port 11 is aligned with one of the windows 22 during loading of pills into the medication ring 7 and similarly the port 11 is moved to a dispensing position as shown in FIG. 1 to allow dispensing of the medication into a quadrant of the four quadrant pill box. These aspects can be appreciated from a review of FIGS. 10 and 11, as well as FIGS. 20 and 21.

With the medication dispenser 2, the main drum assembly 6, when the four quadrant pill box 30 has been loaded into the device, controls the position of the four quadrant pill box 30 beneath the various medication rings 7. The medication collars 9 are effectively controlled to rotate with the individual medication rings 7 in most cases such that the end of the individual pill cells 13 are closed by the collar 9 and the collar 9 does not effectively move relative to the cell. With this arrangement there is no abrasion or breakage of the pills which could occur if the collar 9 frequently rotated relative to the pill cells 13. Furthermore, with this device, each pill or medication is in its own cell 13 and this cell is effectively closed by its own collar 9. The collar 9 remains stationary relative to the cells unless that particular ring and collar are to be used for loading of the medication and dispensing of the medication or dispensing of the medication into the four quadrant pill box 30.

The carriage moves and positions the four quadrant pill box 30 below the particular medication rings 7. The platform of the pill box carriage 34 then rotates the pill box to locate the pill box for dispensing medication into the appropriate quadrant of the pill box.

With the above arrangement, the medication dispenser 2 preferably loads the four quadrant pill box 30 once a day. For example, this loading may occur at a fixed time after the medication for the day has been completed. An empty four quadrant pill box is placed in the device in the load position and the device then receives, moves and rotates the pill box to the appropriate positions.

During individual loading, the medication device detects the loading of a pill into its individual cell as well as detecting the dispensing of the pill from the individual cell. With the present system, the individual medications are separated one from the other, and each medication ring 7 is preferably dedicated to a particular medication. Basically, there is a set up for the medication dispenser 2 and typically this will remain unchanged or subject to only small variations caused by any changes in the medication regime.

By maintaining a medication ring 7 and associated medication collar 9 associated with a particular medication, any pill dust in the individual cells is associated with the same medication. This avoids cross contamination of medications.

It is also possible with this system to have drums preloaded by a pharmacy together with software instructions regarding the dispensing of the medication. Keywords and/or passwords or remote activation, for example, by the pharmacy can be used to provide additional control. In this way drums can be loaded by the pharmacy and installed in the device thereby avoiding the steps to load the drum.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A medication dispensing system comprising
   a motor controlled rotary drum,
   a driven movable carriage positioned at lower edge of said drum adapted to rotatably receive a pill box,
   a divided pill box having a number of cells with said pill box attachable to said movable carriage for receiving medication dispensed from said rotary drum, and
   a computer control module for receiving dispensing control information and loading control information of medication loaded into or dispensed from said rotary drum;
   said motor controlled rotary drum being divided into a series of medications rings with each ring having a series of medication cells open at a periphery of said drum with each medication cell sized to receive a single medication dosage;

said drum further including movable collars with each collar associated with one of said medication rings and partially rotatable relative to the medication ring to open any of said medication cells for loading of or dispensing of medication and movable to a position closing the cells of said medication ring and rotatable with said drum if medication is not being loaded or dispensed;

said computer control module controlling the drive of said rotary drum, said driven carriage and the position of said pill box to allow dispensing of medication into the appropriate cells of said pill box.

2. A medication dispensing system as claimed in claim 1 wherein said rotary drum includes a medication loading position and a medication dispensing position at the same angular positions for each medication ring.

3. A medication dispensing system as claimed in claim 2 wherein each movable collar is independently rotatable on said drum to a loading position opening a cell of the associated medication ring to a dispensing loading port through which medication is loaded; said movable collar being independently rotatable on said drum to a dispensing position opening a cell of the associated medical ring to a dispensing port through which medication is dispensed into said pill box.

4. A medication dispensing system as claimed in claim 3 wherein each movable collar is only movable to said dispensing position when said carriage has been moved to locate said pill box aligned below said dispensing position.

5. A medication dispensing system as claimed in claim 4 wherein each movable collar has a port through which medication passes during the loading or dispensing of the medication associated with the medication ring.

6. A medication dispensing system as claimed in claim 5 wherein said control system includes as part of a pill box load procedure and a pill box release procedure, a security step requiring the user to input security information that is compared with preauthorized security information and only proceeds if a match is obtained.

7. A medication dispensing system as claimed in claim 4 including a touch screen input through which a user can program said system with respect to a desired medication regime of at least one user.

8. A medication dispensing system as claimed in claim 7 wherein said system is programmable for different medication regimes of at least two users.

9. A medication dispensing system as claimed in claim 8 wherein said pill box is a daily pill box divided into four quadrants corresponding to morning, noon, dinner and evening time periods.

10. A medication dispensing system as claimed in claim 1 wherein said pill box is rotatable on said movable carriage to dispense the particular medication into the appropriate cell of said divided pill box.

11. A medication dispensing system as claimed in claim 10 wherein said pill box is rotatable on said platform generally about a center axis of said pill box.

12. A medication dispensing system as claimed in claim 1 including a barcode reader used to scan barcodes identifying particular medications.

* * * * *